(12) United States Patent
Kim et al.

(10) Patent No.: US 9,485,797 B2
(45) Date of Patent: Nov. 1, 2016

(54) METHOD AND APPARATUS FOR DEVICE-TO-DEVICE DIRECT COMMUNICATION

(71) Applicant: Electronics and Telecommunications Research Institute, Daejeon (KR)

(72) Inventors: Hyung Jin Kim, Daejeon (KR); Seungkwon Cho, Daejeon (KR); Soojung Jung, Daejeon (KR); Seokki Kim, Daejeon (KR); Hyun Lee, Daejeon (KR); Sung Cheol Chang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 112 days.

(21) Appl. No.: 14/309,354

(22) Filed: Jun. 19, 2014

(65) Prior Publication Data
US 2014/0376463 A1 Dec. 25, 2014

(30) Foreign Application Priority Data

Jun. 20, 2013 (KR) .................. 10-2013-0071210
Jul. 8, 2013 (KR) .................. 10-2013-0079922
Feb. 12, 2014 (KR) .................. 10-2014-0016229

(51) Int. Cl.
| | |
|---|---|
| *H04W 74/04* | (2009.01) |
| *H04W 76/02* | (2009.01) |
| *H04W 8/00* | (2009.01) |
| *H04W 52/02* | (2009.01) |
| *H04W 56/00* | (2009.01) |
| *H04W 72/12* | (2009.01) |
| *H04W 92/18* | (2009.01) |

(52) U.S. Cl.
CPC ............. *H04W 76/023* (2013.01); *H04W 8/00* (2013.01); *H04W 8/005* (2013.01); *H04W 52/02* (2013.01); *H04W 56/002* (2013.01); *H04W 72/12* (2013.01); *H04W 92/18* (2013.01)

(58) Field of Classification Search
None
See application file for complete search history.

(56) References Cited

U.S. PATENT DOCUMENTS

| | | | | |
|---|---|---|---|---|
| 5,351,245 | A * | 9/1994 | Pregont et al. | 714/704 |
| 2003/0231607 | A1* | 12/2003 | Scanlon et al. | 370/338 |
| 2008/0205454 | A1* | 8/2008 | Riedel et al. | 370/509 |
| 2011/0051656 | A1* | 3/2011 | Hethuin et al. | 370/315 |
| 2012/0163278 | A1 | 6/2012 | Chang et al. | |
| 2014/0064147 | A1* | 3/2014 | Wang et al. | 370/255 |
| 2014/0112233 | A1* | 4/2014 | Bodas et al. | 370/312 |

OTHER PUBLICATIONS

Seokki Kim et al., "A PHY proposal for PAC operates in synchronous mode (ppt)" IEEE P802.15 Working Group for Wireless Personal Area Networks (WPANs) Jul. 8, 2013.

* cited by examiner

*Primary Examiner* — Chi H Pham
*Assistant Examiner* — Shick Hom
(74) *Attorney, Agent, or Firm* — Rabin & Berdo P.C.

(57) ABSTRACT

A D2D direct communication method is provided. The device sets at least one frame among a plurality of frames included in a superframe to a frame type 0 which is sectionized into a synchronization region for performing a synchronization procedure, a discovery region for discovering devices, a peering region for a connection, and a data region for scheduling of resources and data transmission. The device sets remaining frames among the plurality of frames to a frame type 1 which is sectionized into the synchronization region and the data region.

15 Claims, 10 Drawing Sheets

METHOD AND APPARATUS FOR DEVICE-TO-DEVICE DIRECT COMMUNICATION

CROSS-REFERENCE TO RELATED APPLICATION

This application claims priority to and the benefit of Korean Patent Application Nos. 10-2013-0071210, 10-2013-0079922, and 10-201 4-001 6229 filed in the Korean Intellectual Property Office on Jun. 20, 2013, Jul. 8, 2013, and Feb. 12, 2014, the entire contents of which are incorporated herein by reference.

BACKGROUND (a) Field

The present invention generally relates to a device-to-device direction communication.

(b) Description of the Related Art

Recently, interest in a device-to-device (D2D) direct communication is increasing for providing a proximity-based service. Accordingly, various techniques for supporting the D2D direct communication are developed.

A wireless communication system such as a wireless local area network (WLAN) performs a carrier sensing for the D2D direct communication. The carrier sensing requires much high power and resource consumption. Particularly, if the number of devices increases, a probability with which a device occupies the resource decreases and a probability with which a collision occurs at the occupied resource increases. As a result, use efficiency of the resource is reduced.

A scheme for avoiding the collision with the other devices based on the carrier sensing has been developed. However, if the number of devices increases, signals for avoiding the collision occupies almost all of the resources, so the resources cannot be used for traffics to be transmitted.

SUMMARY

An aspect of the present invention provides a D2D direct communication method and apparatus for efficiently using resources.

According to another aspect of the present invention, a direct communication method by a device in a D2D direct communication is provided. The method includes setting at least one frame among a plurality of frames included in a superframe to a frame type 0 which is sectionized into a synchronization region for performing a synchronization procedure, a discovery region for discovering devices, a peering region for a connection, and a data region for scheduling of resources and data transmission. The method further includes setting remaining frames among the plurality of frames to a frame type 1 which is sectionized into the synchronization region and the data region. The method further includes transmitting or receiving signals in the synchronization region, the discovery region, the peering, and the data region.

The frame that is set to the frame type 0 may be a frame that is located at head of the superframe.

The synchronization region may be located at head of each of the frames.

Transmitting or receiving signals may include repeatedly transmitting a synchronization signal in the synchronization region.

The method may further include determining a channel state by interference sensing in at least one region of the discovery region, the peering region, and the data region, and using a resource of an interval in which the channel state is idle.

The method may further include transmitting a blocking signal for preventing intrusion of different kinds of terminals in the interval in which the resource is used.

Transmitting the blocking signal may include transmitting the blocking signal through at least one subcarrier.

The discovery region may include a plurality of resource unit groups and a plurality of interference sensing intervals for performing the interference sensing. Each of the resource unit groups may include a plurality of resource units, and follow a corresponding one of the interference sensing intervals.

The peering region may include a peering request/response interval for establishing a peering identity (PID) and a PID broadcast interval for broadcasting the PID. The peering request/response may include a plurality of first resource unit groups and a plurality of first interference sensing intervals for performing the interference sensing. Each of the first resource unit groups may include a plurality of resource units, and follow a corresponding one of the first interference sensing intervals. The PID broadcast interval may include a second resource unit group including a plurality of resource unit and a second interference sensing interval for performing the interference sensing and followed by the second resource unit group.

The data region may include a scheduling interval for scheduling of resources and a data interval for transmission of data bursts. The scheduling may include a resource unit group including a plurality of resource units and an interference sensing interval for performing the interference sensing and followed by the resource unit group. The data interval may include a plurality of data burst intervals and a plurality of feedback intervals respectively corresponding to the data burst intervals. A number of the data burst intervals and a length of each of the data burst intervals may be varied according to a result of the scheduling According to yet another aspect of the present invention, a direct communication apparatus is provided by a device in a D2D direct communication. The method includes setting a superframe, and transmitting or receiving signals in the superframe. The superframe includes a plurality of frames, and the plurality of frames include a frame type 0 and a frame type 1. The frame type 0 is sectionized into a synchronization region for performing a synchronization procedure, a discovery region for discovering devices, a peering region for a connection, and a data region for scheduling of resources and data transmission. The frame type 1 is sectionized into the synchronization region and the data region.

A frame that is located at head of the superframe may be the frame type 0, and remaining frames may be the frame type 1.

The synchronization region may be located at head of each of the frames.

At least one region of the discovery region, the peering region and the data region may include a first interval for determining a channel state by interference sensing and a second interval followed by the first interval and including a plurality of resource units.

Transmitting or receiving signals may include using a resource of the second interval when it is determined in the first interval that the channel state is idle and transmitting a blocking signal for preventing intrusion of different kinds of terminals in the second interval in which the resource is used.

According to further aspect of the present invention, a direct communication apparatus is provided in a D2D direct communication. The apparatus includes a frame generator configured to set a superframe and a transceiver configured to transmit or receive signals in the superframe. The superframe includes a plurality of frames, and the plurality of frames include a frame type 0 and a frame type 1. The frame type 0 is sectionized into a synchronization region for performing a synchronization procedure, a discovery region for discovering devices, a peering region for a connection, and a data region for scheduling of resources and data transmission. The frame type 1 is sectionized into the synchronization region and the data region.

A frame that is located at head of the superframe may be the frame type 0, and remaining frames may be the frame type 1.

The synchronization region may be located at head of each of the frames.

At least one region of the discovery region, the peering region and the data region may include a first interval for determining a channel state by interference sensing and a second interval followed by the first interval and including a plurality of resource units.

The transceiver may use a resource of the second interval when it is determined in the first interval that the channel state is idle, and transmit a blocking signal for preventing intrusion of different kinds of terminals in the second interval in which the resource is used.

DETAILED DESCRIPTION OF THE EMBODIMENTS

Figure 1:
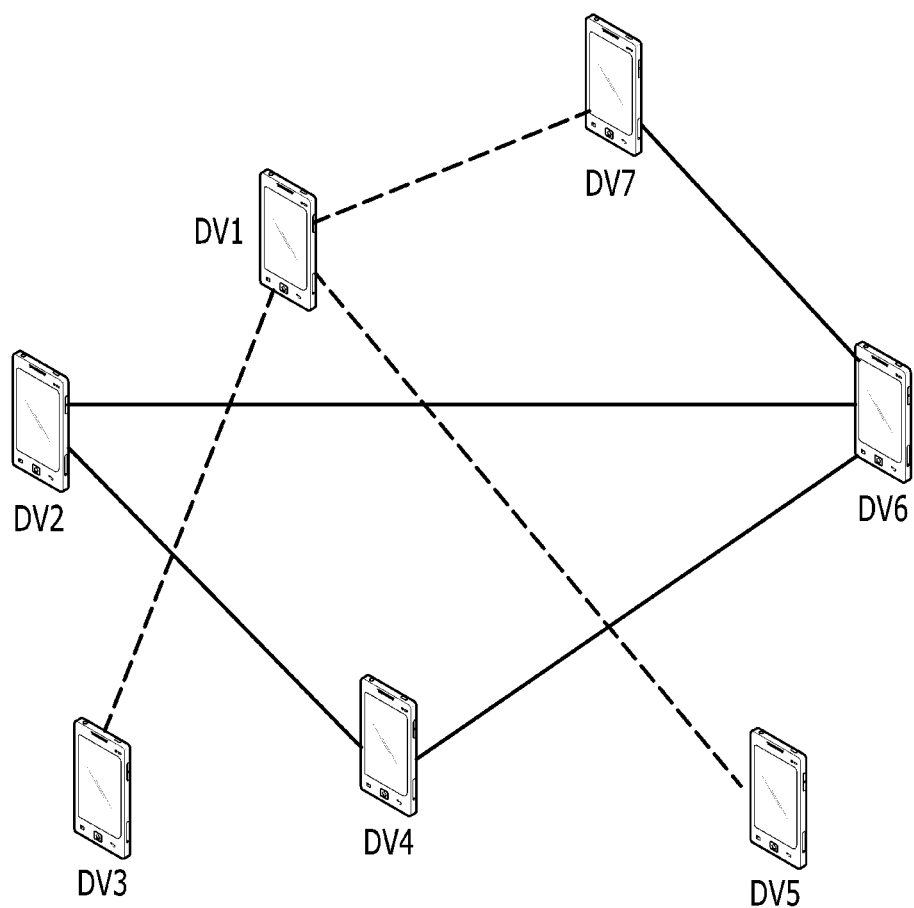
FIG. 1 shows a D2D direct communication system according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 2:
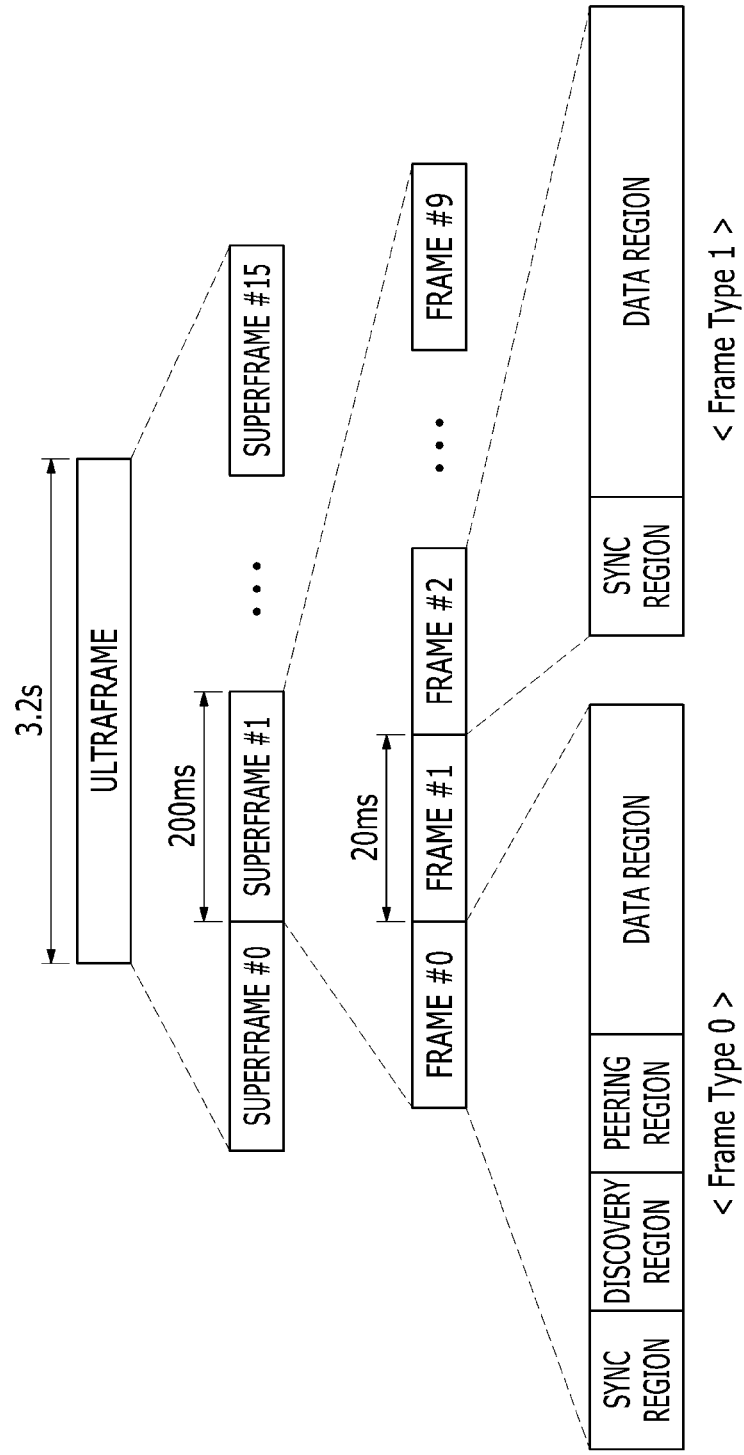
FIG. 2 shows a frame structure of a D2D direct communication system according to an embodiment of the present invention.
Figure 3:
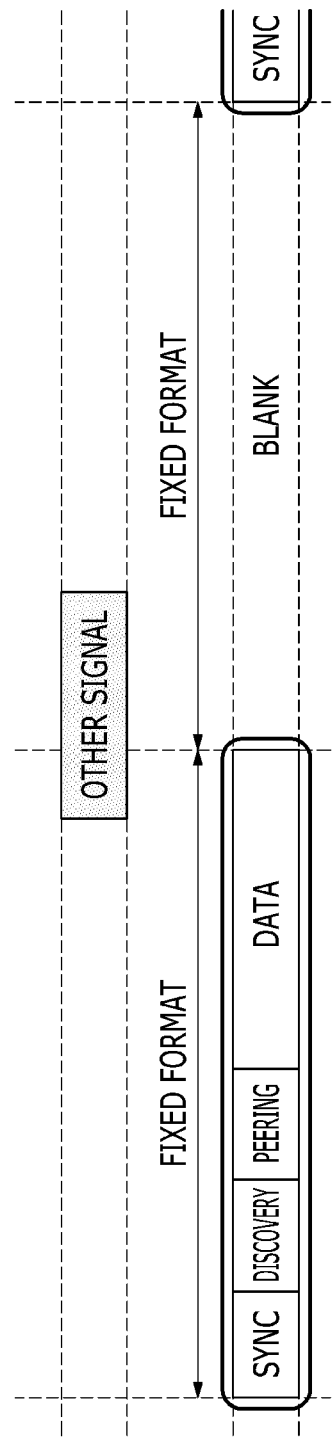
FIG. 3 shows an example of a method for operating a frame with a fixed format in a D2D direct communication system according to an embodiment of the present invention.
Figure 4:
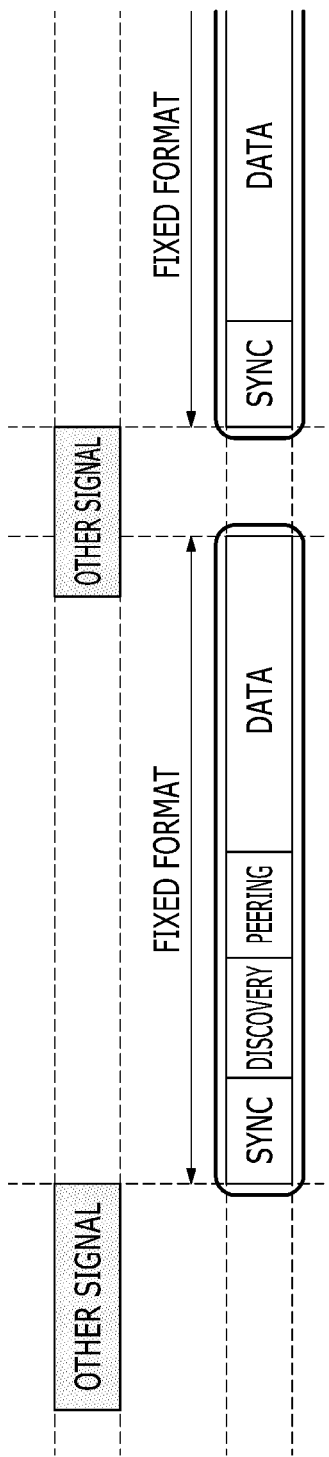
FIG. 4 shows another example of a method for operating a frame with a fixed format in a D2D direct communication system according to an embodiment of the present invention.

FIG. 1 shows a D2D direct communication system according to an embodiment of the present invention, FIG. 2 shows a frame structure of a D2D direct communication system according to an embodiment of the present invention, FIG. 3 shows an example of a method for operating a frame with a fixed format in a D2D direct communication system according to an embodiment of the present invention, and FIG. 4 shows another example of a method for operating a frame with a fixed format in a D2D direct communication system according to an embodiment of the present invention.

Referring to FIG. 1, a plurality of devices DV1, DV2, DV3, DV4, DV5, DV6, and DV7 join in a D2D direct communication. A one-to-one communication (DV1 to DV7, DV3 to DV5, DV5 to DV7, or DV3 to DV7) may be performed between one device and the other device, or one-to-many communication may be performed between one device DV2 and the other devices DV1, DV4, and DV6. The devices DV1-DV7 perform the D2D direct communication at an unlicensed band.

As shown in FIG. 2, a superframe is continuously repeated in a frame structure for the D2D direct communication at the unlicensed band. A plurality of superframes form an ultraframe, and each superframe includes a plurality of frames. For example, the ultraframe may consist of 16 superframes, and the superframe may consist of 10 frames. The ultraframe may have a length of 3.2 s, the superframe may have a length of 200 ms, and the frame may have a length of 20 ms.

The frame may be classified into two kinds of frame type, i.e., frame type 0 and frame type 1, in accordance with its usage. The frame type 0 includes a synchronization region, a discovery region, a peering region, and a data region, and the frame type 1 includes a synchronization region and a data region. In each superframe, the first frame whose frame number is 0 (frame #0) may be the frame type 0, and remaining frames may be the frame type 1. The first frame is a frame that is located at the head of the superframe. The frame has a fixed length, i.e., a fixed structure regardless of the type, and is sectionized according to the type.

In the frame type 0, the discovery region is a region for discovery of other devices for the D2D direct communication, the peering region is a region for connection between the devices, and the data region is a region for scheduling resources in the devices and transmitting data. In the frame type 1, the discovery region and the peering region are substituted into the data region. As such, since the discovery region, the peering region, and the data region are fixed within the frame, the device can wake up at the region corresponding to an operation which should be performed after synchronization. Therefore, the power can be saved. For the synchronization of the device, the frame includes a fixed region for transmitting and receiving a synchronization signal, i.e., the synchronization region regardless of the type. The synchronization region may be located at the head of the frame.

As shown in FIG. 3, the frame with fixed structure may be continuously arranged. In this case, when other signal exists at the beginning of the synchronization region, the frame having the corresponding synchronization region may be blanked.

Alternatively, as shown in FIG. 4, when the other signal exists at the beginning of the synchronization region, the frame having the corresponding synchronization region may start after the other signal ends. In other words, a variable gap may exist between two frames with fixed structure. In this case, if the other signal does not exist at the beginning of the synchronization region, the frame having the corresponding synchronization region may be continuous to the previous frame.

Figure 5:
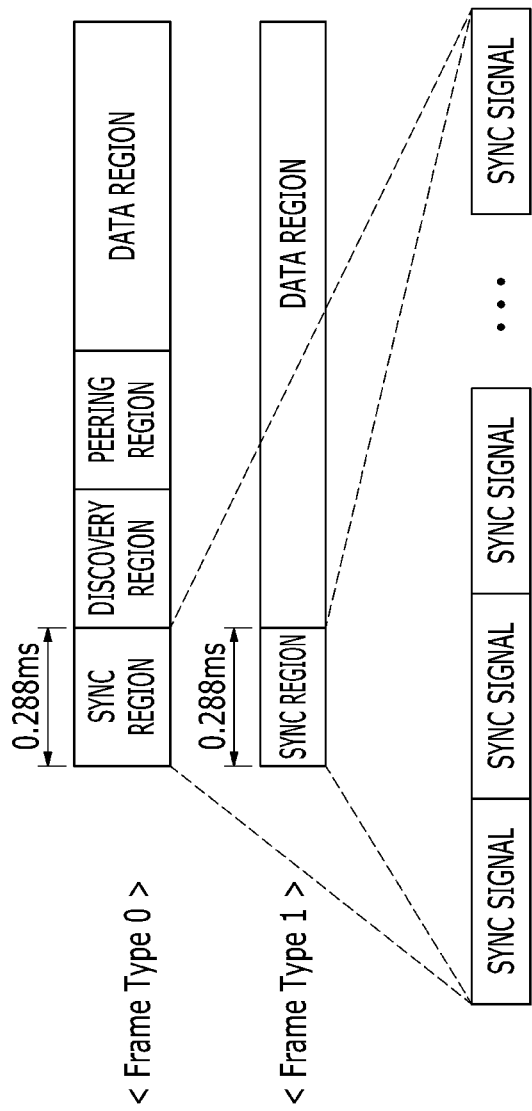
FIG. 5 shows a synchronization region in a frame structure of a D2D direct communication system according to an embodiment of the present invention.

FIG. 5 shows a synchronization region in a frame structure of a D2D direct communication system according to an embodiment of the present invention.

Referring to FIG. 5, a synchronization region has a fixed length (for example, 0.288 ms) and is located at the head of a frame regardless of the type. Each device performs a synchronization procedure by transmitting or receiving a synchronization signal in the synchronization region. As shown in FIG. 5, the synchronization signal may be repeatedly transmitted in the synchronization region to increase reliability, and the synchronization signal may be hopped in a frequency domain.

Figure 6:
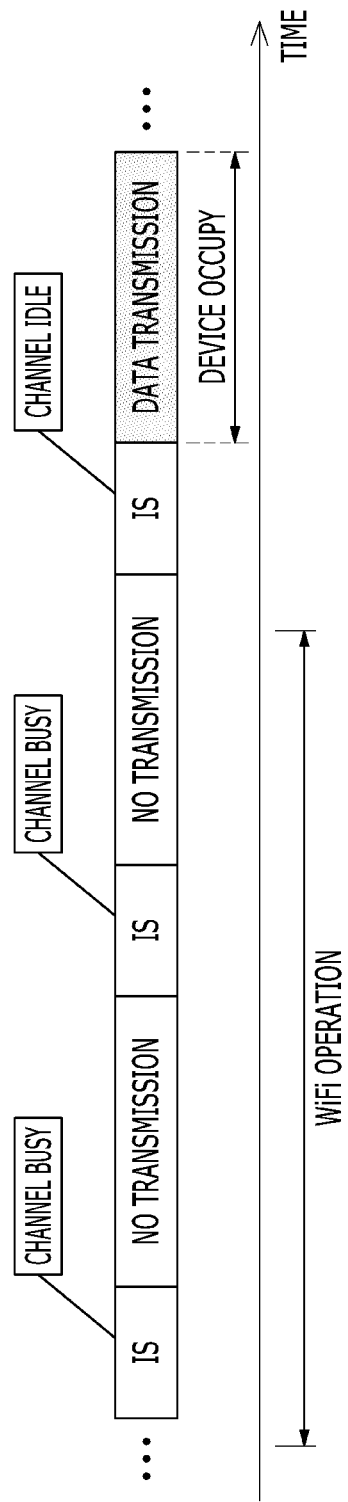
FIG. 6 shows an interference sensing in a D2D direction communication system according to an embodiment of the present invention.

FIG. 6 shows an interference sensing in a D2D direction communication system according to an embodiment of the present invention.

Referring to FIG. 6, each of a discovery region, a peering region, and a data region includes an interference sensing (IS) interval and a resource unit (RU) differently from a synchronization region. A plurality of RUs may be continuously follow a single IS interval.

In the IS interval, each device senses the interference to determine whether a channel state is busy or idle. If the channel state is idle, the device occupies an RU following the IS interval to transmit a signal. If the channel state is busy, the device does not occupy the RS following the IS interval.

When the plurality of RUs are continuously arranged after the IS interval, even if devices for the D2D direct communication occupy some RUs and transmit signals, unused RUs may exist among the plurality of RUs. In this case, to prevent intrusion of different kinds of terminals, devices which are going to use the RUs may transmit a blocking signal in the RUs. The blocking signal may be transmitted through at least one subcarrier. The RUs for transmitting the blocking signal may be called a blocking unit.

As described above, according to an embodiment of the present invention, since the blocking signal can blocking the different kinds of terminal from occupying the resources, the device can perform a distributed operation.

Figure 7:
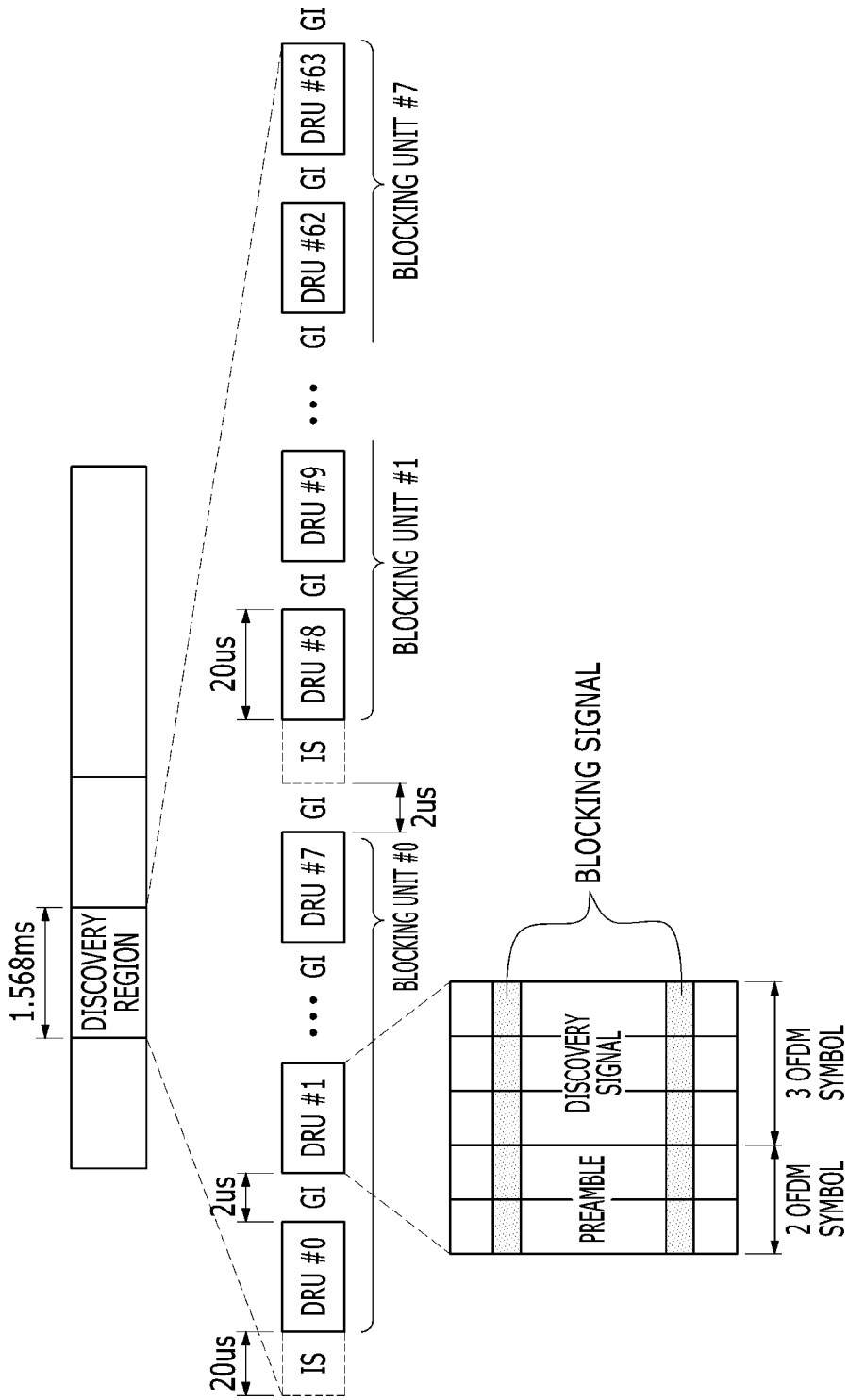
FIG. 7 shows a discovery region in a frame structure of a D2D direct communication system according to an embodiment of the present invention.

FIG. 7 shows a discovery region in a frame structure of a D2D direct communication system according to an embodiment of the present invention.

Referring to FIG. 7, a discovery region has a fixed length (for example, 1.568 ms) and may be located after a synchronization region. The discovery region is used for a device to broadcast own information. The discovery region includes a plurality of discovery RUs for a plurality of devices, for example 64 discovery RUs (DRU #0 to DRU #63). A guard interval (GI) may follow each discovery RU. The guard interval may be used for a transition time between the discovery RUs and a synchronization error.

The discover region further includes a plurality of IS intervals. A plurality of discovery RUs, for example 8 discovery RUs, are continuously arranged after each IS interval. The 8 discovery RUs may form one blocking unit.

Each discovery resource unit is divided into a preamble interval and a discovery interval in a time domain. For example, the preamble interval may include two orthogonal frequency division multiplexing (OFDM) symbols, and the discovery interval may include three OFDM symbols. At least one subcarrier of the discovery RU may be used for transmission of a blocking signal. It is shown in FIG. 7 that two subcarriers are used for transmission of the blocking signal. A preamble for automatic gain control (AGC), timing and frequency synchronization, and channel estimation is transmitted in the preamble interval. A discovery signal for transmission of discovery-related information is transmitted in the discovery interval.

As described above, according to an embodiment of the present invention, since a plurality of discover RUs are provided for discoveries of a plurality of devices, many devices can be discovered during one ultraframe. For example, since 1024 discovery RUs are provided during the ultraframe of 3.2 s, 1024 devices can be discovered.

Figure 8:
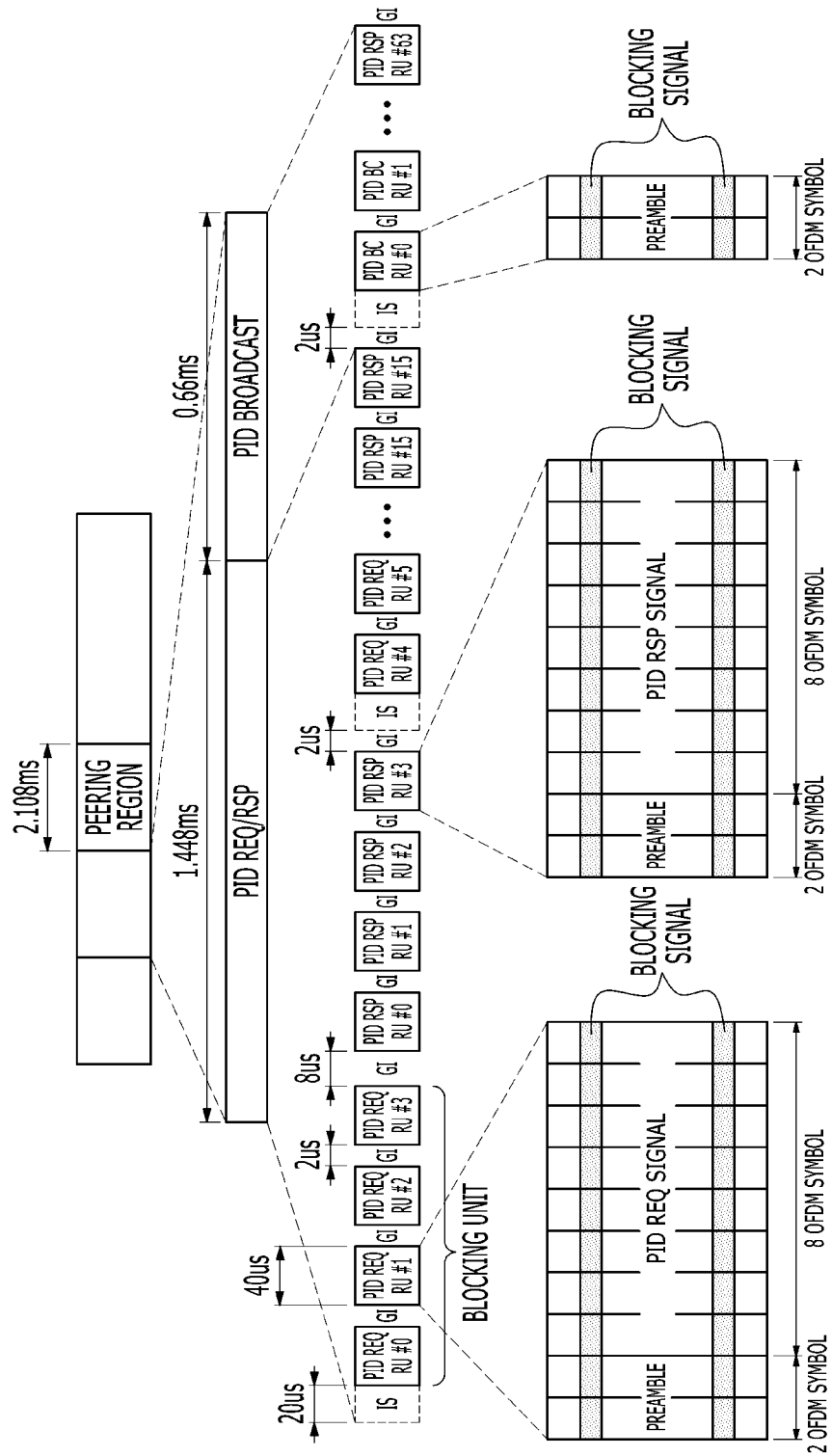
FIG. 8 shows a peering region in a frame structure of a D2D direct communication system according to an embodiment of the present invention.

FIG. 8 shows a peering region in a frame structure of a D2D direct communication system according to an embodiment of the present invention.

A peering region is used for broadcasting a peering identity (PID) for a D2D direct communication to notify the PID being used, and for requesting a PID establishment and responding to the request to establish the PID with the specific device. Referring to FIG. 8, the peering region includes a peering request/response (REQ/RSP) interval and PID broadcast interval. The peering region has a fixed length (for example, 2.108 ms) and may be located after the discovery region. The peering REQ/RSP interval may have a length of 1.448 ms, and the PID broadcast interval may have a length of 0.66 ms.

The peering REQ/RSP interval includes a plurality of peering REQ/RSP RUs, for example 16 peering REQ/RSP RUs, i.e., 16 peering REQ RUs and 16 peering RSP RUs, for a plurality of devices. The peering REQ/RSP interval is used for exchanging peering-related information, for example information for the PID establishment. A guard interval (GI) may follow each peering REQ/RSP RU. The peering REQ/RSP interval further includes a plurality of IS intervals. A plurality of peering REQ/RSP RUs are continuously arranged after each IS interval. In this case, four prepositive RUs may be peering REQ RUs for requesting the peering-related information, and four postpositive RUs may be peering RSP RUs for responding to the request of the peering-related information. The four peering REQ RUs may form one peering REQ blocking unit, and the four peering RSP RUs may form one peering RSP blocking unit.

The peering REQ RU is divided into a preamble interval and a peering REQ interval in a time domain. For example, the preamble interval may include two OFDM symbols, and the peering REQ interval may include eighth OFDM symbols. Similarly, the peering RSP RU is divided into a preamble interval and a peering RSP interval in the time domain. For example, the preamble interval may include two OFDM symbols, and the peering RSP interval may include eighth OFDM symbols. At least one subcarrier of the peering REQ/RSP RU may be used for transmission of a blocking signal. A preamble is transmitted in the preamble interval, and a request/response signal for exchanging the peering-related information is transmitted in the peering REQ/RSP interval.

The PID broadcast interval includes a plurality of PID broadcast RUs, for example 64 PID broadcast RUs, for a plurality of devices, and is used for broadcasting the PID being used. A guard interval (GI) may follow each PID broadcast RU. The PID broadcast interval further includes one IS interval. A plurality of PID broadcast RUs, for example 64 PID broadcast RUs (PID BC RU #0 to PID BC RU #63), are continuously arranged after the IS interval. The 64 PID broadcast RUs may form one PID broadcast blocking unit.

Each PID broadcast RU may include two OFDM symbols in the time domain. At least one subcarrier of the PID broadcast RU may be used for transmitting a blocking signal. Since a device which is transmitting the PID when a certain device broadcasts the PID cannot listen to the broadcasted PID of a corresponding interval, the device may broadcast the PID by shuffling a broadcasting pattern. Accordingly, two broadcasting patterns may be repeated in the PID broadcast interval.

As described above, according to an embodiment of the present invention, since a plurality of PID broadcast RUs are provided for a plurality of devices, many devices can be concurrently activated.

Figure 9:
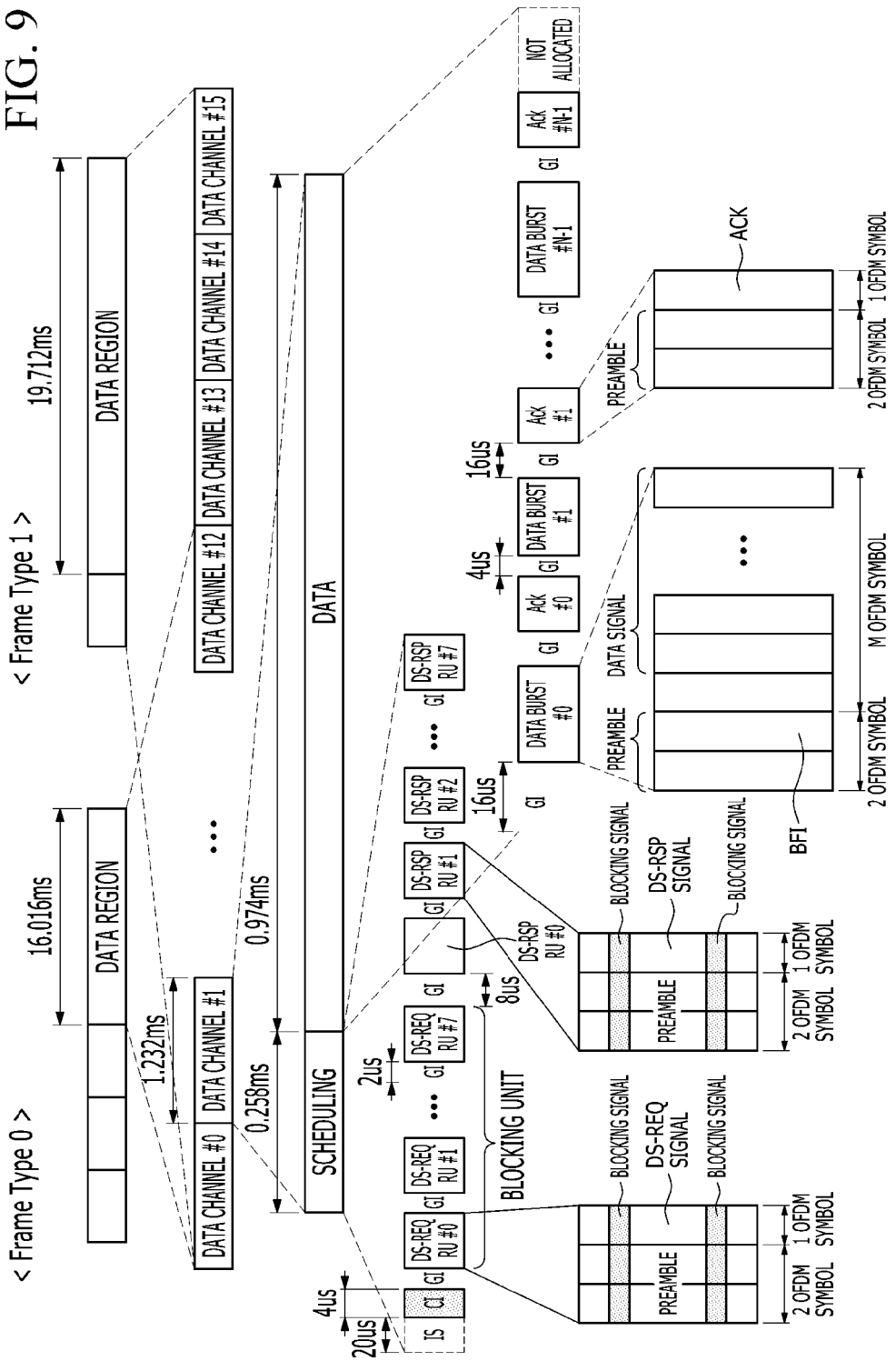
FIG. 9 shows a data region in a frame structure of a D2D direct communication system according to an embodiment of the present invention.

FIG. 9 shows a data region in a frame structure of a D2D direct communication system according to an embodiment of the present invention.

Referring to FIG. 9, a data region includes a plurality of data channels, and each data channel includes a scheduling interval and a data interval. A frame type 1 includes more data channels than a frame type 0. In the frame type 1, the data region having a fixed length (for example, 19.712 ms) may follow a synchronization region, and may include 16 data channels (Data Channel #0 to Data Channel #15). In the frame type 0, the data region having a fixed length (for example, 16.016 ms) may follow a peering region, and may include 13 data channels (Data Channel #3 to Data Channel #15). In the data channel, the scheduling interval may have a length of 0.258 ms, and the data interval may have a length of 0.974 ms.

For a distributed scheduling (DS) between a plurality of devices, the scheduling interval includes a plurality of DS request/response (DS-REQ/RSP) RUs, for example 8 DS-REQ/RSP RUs, i.e., 8 DS-REQ RUs and 8 DS-RSP RUs. A guard interval (GI) may follow each DS-REQ/RSP RU. The scheduling interval further includes an IS interval. A plurality of peering DS-REQ/RSP RUs are continuously arranged after the IS interval. In this case, 8 prepositive RUs may be DS-REQ RUs for requesting scheduling-related information, and 8 postpositive RUs may be DS-RSP RUs for responding to the request of the scheduling-related information. The eight DS-REQ RUs may form one DS-REQ blocking unit, and the eighth DS-RSP RUs may form one DS-RSP blocking unit. In the scheduling interval, a device can occupy a resource for data transmission by exchanging a DS-REQ message and a DS-RSP message.

The scheduling interval may further include a scheduling request indicator (SRI) interval for transmission of an SRI. The SRI is used for indicating a consecutive allocation of a resource. The SRI interval may be located after the IS interval, and a guard interval may follow the SRI interval.

The DS-REQ RU is divided into a preamble interval and a DS-REQ interval in a time domain. For example, the preamble interval may include two OFDM symbols, and the DS-REQ interval may include one OFDM symbol. Similarly, the DS-RSP RU is divided into a preamble interval and a DS-RSP interval in the time domain. For example, the preamble interval may include two OFDM symbols, and the DS-RSP interval may include one OFDM symbol. The SRI interval may include one OFDM symbol in the time domain. At least one subcarrier of the DS-REQ/RSP RU and the SRI interval may be used for transmitting a blocking signal.

The data interval includes a plurality of data burst intervals and a plurality of feedback intervals. Each feedback interval follows a corresponding data burst interval, and a guard interval (GI) may be located after the data burst interval and the feedback interval. The data burst interval is an interval for transmission of a data burst. The number of data burst intervals included in the data interval and the length of the data burst interval are varied according to the result of distributed scheduling. When the scheduling interval has 8DS-REQ/RSP RUs, the number of data burst intervals is equal to or less than 8according to the scheduling result at the scheduling interval. A device that has occupied a resource in the scheduling interval transmits the data in the data burst interval, and a device that has received the data transmits an acknowledgement (ACK) to the received data in the feedback interval.

The data burst interval is divided into a preamble interval, a burst control indicator (BCI) interval, and a data interval in a time domain. For example, the preamble interval may include two OFDM symbols, the BCI interval may include one OFDM symbol, and the data interval may include a plurality of OFDM symbols. The preamble interval transmits the preamble, and the data interval transmits the data burst. The BCI interval transmits a BCI for indication of a data burst format and modulation and coding scheme (MCS) information. Since the data burst interval is a resource occupied by the scheduling, a blocking signal is not transmitted in the data burst interval.

As described above, according to an embodiment of the present invention, a signaling overhead that is a ratio of non-data interval (i.e., synchronization, discovery, peering, scheduling, preamble, and feedback intervals) to a total interval can be maintained at a certain ratio. In the non-data interval, it is determined by the interference sensing whether a signal is transmitted or not, and other signal can be blocked by the blocking signal when the signal is transmitted. Accordingly, the devices for the D2D direct communication can coexist with different kinds of terminals.

Further, according to an embodiment of the present invention, a D2D direct communication can be provided for many devices within limited resources.

Next, a direct communication apparatus in a D2D direct communication system according to an embodiment of the present invention is described with reference to FIG. 10.

Figure 10:
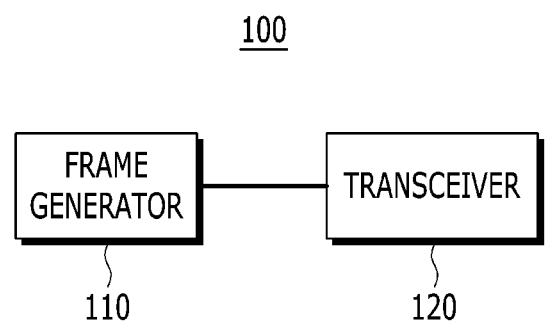
FIG. 10 is a block diagram of a direct communication apparatus in a D2D direct communication system according to an embodiment of the present invention.

FIG. 10 is a block diagram of a direct communication apparatus in a D2D direct communication system according to an embodiment of the present invention.

Referring to FIG. 10, a direct communication apparatus 100 includes a frame generator 110 and a transceiver 120. The direct communication apparatus 100 may be included a device or may be the device itself.

The frame generator 110 generates a superframe by setting the first frame to a frame type 0 which is sectionized into a synchronization region, a discovery region, a peering region and a data region, and setting remaining frames to a frame type 1 which is sectionized into a synchronization region and a data region. The frame generator 110 generates an ultraframe by a plurality of superframes. The transceiver 120 transmits or receives signals according to each region of the superframe.

Accordingly, each device can perform synchronization in the synchronization region, discover a device in the discovery region, perform a connection with the device in the peering region, and occupy a resource to transmit or receive a data for a direct communication in the data region.

At least part function of a direct communication method or apparatus according to an embodiment of the present invention may be implemented by hardware or software combined with the hardware. For example, a processor such as a central processing unit (CPU), other chipset, or a microprocessor may perform a function of a frame generator 110, and a physical transceiver may perform a function of a transceiver 120.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A direct communication method by a device in a device-to-device (D2D) direct communication, the method comprising:
    setting at least one frame among a plurality of frames included in a superframe to a frame type 0 which is sectionized into a synchronization region for performing a synchronization procedure, a discovery region for discovering devices, a peering region for a connection, and a data region for scheduling of resources and data transmission;
    setting remaining frames among the plurality of frames to a frame type 1 which is sectionized into the synchronization region and the data region;
    transmitting or receiving signals in the synchronization region, the discovery region, the peering, and the data region;
    determining a channel state by interference sensing in at least one region among the discovery region, the peering region, and the data region; and
    using a resource of an interval in which the channel state is idle.

2. The method of claim 1, wherein the frame that is set to the frame type 0 is a frame that is located at head of the superframe.

3. The method of claim 1, wherein the synchronization region is located at head of each of the frames.

4. The method of claim 1, wherein transmitting or receiving signals includes repeatedly transmitting a synchronization signal in the synchronization region.

5. The method of claim 1, further comprising:
    transmitting a blocking signal for preventing intrusion of different kinds of terminals in the interval in which the resource is used.

6. The method of claim 5, wherein transmitting the blocking signal includes transmitting the blocking signal through at least one subcarrier.

7. The method of claim 5, wherein the discovery region includes a plurality of resource unit groups and a plurality of interference sensing intervals for performing the interference sensing, each of the resource unit groups including a plurality of resource units, and following a corresponding one of the interference sensing intervals.

8. The method of claim 5, wherein the peering region includes a peering request/response interval for establishing a peering identity (PID) and a PID broadcast interval for broadcasting the PID,
    wherein the peering request/response includes a plurality of first resource unit groups and a plurality of first interference sensing intervals for performing the interference sensing, each of the first resource unit groups including a plurality of resource units, and following a corresponding one of the first interference sensing intervals, and
    wherein the PID broadcast interval includes a second resource unit group including a plurality of resource unit and a second interference sensing interval for performing the interference sensing and followed by the second resource unit group.

9. The method of claim 5, wherein the data region includes a scheduling interval for scheduling of resources and a data interval for transmission of data bursts,
    wherein the scheduling includes a resource unit group including a plurality of resource units and an interference sensing interval for performing the interference sensing and followed by the resource unit group,
    the data interval includes a plurality of data burst intervals and a plurality of feedback intervals respectively corresponding to the data burst intervals,
    a number of the data burst intervals and a length of each of the data burst intervals are varied according to a result of the scheduling.

10. A direct communication apparatus by a device in a device-to-device (D2D) direct communication, the method comprising:
    setting a superframe; and
    transmitting or receiving signals in the superframe,
    wherein the superframe includes a plurality of frames,
    wherein the plurality of frames include a frame type 0 and a frame type 1,
    wherein the frame type 0 is sectionized into a synchronization region for performing a synchronization procedure, a discovery region for discovering devices, a peering region for a connection, and a data region for scheduling of resources and data transmission,
    wherein the frame type 1 is sectionized into the synchronization region and the data region,
    wherein at least one region among the discovery region, the peering region and the data region includes:
        a first interval for determining a channel state by interference sensing; and
        a second interval following the first interval and including a plurality of resource units, and
    wherein transmitting or receiving signals includes:
        using a resource of the second interval when it is determined in the first interval that the channel state is idle; and
        transmitting a blocking signal for preventing intrusion of different kinds of terminals in the second interval in which the resource is used.

11. The method of claim 10, wherein a frame that is located at head of the superframe is the frame type 0, and remaining frames are the frame type 1.

12. The method of claim 10, wherein the synchronization region is located at head of each of the frames.

13. A direct communication apparatus in a device-to-device (D2D) direct communication, the apparatus comprising:
    a frame generator configured to set a superframe; and
    a transceiver configured to transmit or receive signals in the superframe,
    wherein the superframe includes a plurality of frames,
    wherein the plurality of frames include a frame type 0 and a frame type 1, wherein the frame type 0 is sectionized into a synchronization region for performing a synchronization procedure, a discovery region for discovering devices, a peering region for a connection, and a data region for scheduling of resources and data transmission, wherein the frame type 1 is sectionized into the synchronization region and the data region, and wherein at least one region among the discovery region, the peering region and the data region includes:
- a first interval for determining a channel state by interference sensing; and
- a second interval following the first interval and including a plurality of resource units, and wherein the transceiver uses a resource of the second interval when it is determined in the first interval that the channel state is idle, and transmits a blocking signal for preventing intrusion of different kinds of terminals in the second interval in which the resource is used.

14. The apparatus of claim 13, wherein a frame that is located at head of the superframe is the frame type 0, and remaining frames are the frame type 1.

15. The apparatus of claim 13, wherein the synchronization region is located at head of each of the frames.

* * * * *